United States Patent
Haentzschel et al.

(10) Patent No.: US 8,380,137 B2
(45) Date of Patent: Feb. 19, 2013

(54) CIRCUIT, PROCESS, AND USE OF A MEMORY FOR TRANSMITTING AND/OR RECEIVING IN A RADIO NETWORK

(75) Inventors: Dirk Haentzschel, Porschendorf (DE); Thomas Hanusch, Coswig (DE)

(73) Assignee: Atmel Corporation, San Jose, CA (US)

( * ) Notice: Subject to any disclaimer, the term of this patent is extended or adjusted under 35 U.S.C. 154(b) by 629 days.

(21) Appl. No.: 12/556,850

(22) Filed: Sep. 10, 2009

(65) Prior Publication Data
US 2010/0062729 A1    Mar. 11, 2010

Related U.S. Application Data

(60) Provisional application No. 61/096,032, filed on Sep. 11, 2008.

(30) Foreign Application Priority Data

Sep. 10, 2008    (DE) .......................... 10 2008 046 681

(51) Int. Cl.
*H04B 1/38*    (2006.01)
(52) U.S. Cl. ......... 455/73; 455/91; 455/130; 455/183.2; 710/310
(58) Field of Classification Search ............... 455/73, 455/91, 130, 183.2, 186.1, 234.2; 710/310, 710/200
See application file for complete search history.

(56) References Cited

U.S. PATENT DOCUMENTS

| | | | | |
|---|---|---|---|---|
| 4,823,340 A | * | 4/1989 | Grassman et al. | 370/368 |
| 5,333,198 A | * | 7/1994 | Houlberg et al. | 380/270 |
| 5,379,379 A | * | 1/1995 | Becker et al. | 711/3 |
| 5,541,930 A | | 7/1996 | Klingman | |
| 5,935,220 A | * | 8/1999 | Lumpkin et al. | 710/5 |
| 5,943,505 A | * | 8/1999 | Lumpkin et al. | 710/31 |
| 6,433,786 B1 | * | 8/2002 | Jones, Jr. | 345/544 |
| 6,895,452 B1 | | 5/2005 | Coleman et al. | |
| 7,000,039 B2 | * | 2/2006 | Ishibashi | 710/74 |
| 7,054,986 B2 | * | 5/2006 | Zhao et al. | 710/310 |
| 7,373,208 B2 | * | 5/2008 | Ozaki et al. | 700/79 |
| 2002/0141438 A1 | * | 10/2002 | Smith et al. | 370/465 |
| 2002/0144038 A1 | * | 10/2002 | Smith | 710/240 |
| 2004/0025040 A1 | | 2/2004 | Aoki et al. | |
| 2004/0225779 A1 | * | 11/2004 | Zhao et al. | 710/200 |
| 2006/0133616 A1 | * | 6/2006 | Kim et al. | 380/277 |
| 2007/0010899 A1 | * | 1/2007 | Ozaki et al. | 700/19 |

OTHER PUBLICATIONS

Text of the First Office Action dated Jun. 13, 2012 with regard to Chinese Application No. 200910172898.X, Chinese Version and English translation, transmitted to Baker Botts on Sep. 4, 2012.

* cited by examiner

*Primary Examiner* — Minh D Dao
(74) *Attorney, Agent, or Firm* — Baker Botts L.L.P.

(57) ABSTRACT

Circuit, process, and use of a memory for transmitting and/or receiving in a radio network, with a memory, which has a first interface for reading and writing and a second interface for reading and writing, with an arithmetic logic unit, which is connected to the first interface for reading and writing, with a control unit, which is connected to the second interface for reading and writing, and with a transmit/receive unit, which is connected to the control unit for writing received data via the second interface of the memory and for reading transmit data via the second interface of the memory.

11 Claims, 5 Drawing Sheets

CIRCUIT, PROCESS, AND USE OF A MEMORY FOR TRANSMITTING AND/OR RECEIVING IN A RADIO NETWORK

This nonprovisional application claims priority to German Patent Application No. 10 2008 046 681.6, which was filed in Germany on Sep. 10, 2008, and to U.S. Provisional Application No. 61/096,032, which was filed on Sep. 11, 2008, and which are both herein incorporated by reference.

BACKGROUND OF THE INVENTION

1. Field of the Invention

The present invention relates to a circuit, a process for transmitting and/or receiving, and use of a memory in a radio network.

2. Description of the Background Art

An example of a radio network device is shown schematically in FIG. 5. A transceiver TRX enables the transmission and receiving of data, which are stored temporarily in a buffer BUF. A microcontroller μC downloads the received data from the buffer BUF and copies or moves them into the memory RAM. The received data are then decrypted by means of AES decryption software. In the case of transmission, the data stored in the memory RAM are first encrypted by AES software of the microcontroller μC and the encrypted data are then loaded from the memory RAM into the buffer BUF. The transmission occurs again with the use of the transceiver TRX.

SUMMARY OF THE INVENTION

It is therefore an object of the present invention to improve a circuit for receiving in a radio network as much as possible. Accordingly, a circuit for transmitting and/or receiving in a radio network is provided. A radio network according to an embodiment can be a network according to the industry standard IEEE 802.15.4. Further, the circuit can be integrated monolithically on a semiconductor chip.

The circuit can have a memory, which has a first interface for reading and writing and a second interface for reading and writing. This type of memory can also be called a dual-port memory. The first and second interfaces are preferably formed for access independent of one another. Therefore, the memory can be accessed by reading or writing via the first interface at the same time as another access (read/write) via the second interface. Preferably, the memory is formed as a volatile memory with random access, for example, in the form of RAM (random access memory).

The circuit can have an arithmetic logic unit, which is connected to the first interface for reading and writing. The arithmetic logic unit is advantageously a computing core of a microcontroller. The connection is preferably a bus, for example, an address bus and/or a data bus. The arithmetic logic unit, in contrast, is not connected to the second interface of the memory for reading or writing.

The circuit can have a control unit, which is connected to the second interface for reading and writing. The control unit is preferably a subcircuit, which controls at least the access to the memory via the second interface. The control unit, in contrast, is not connected to the first interface of the memory.

The circuit can have a transmit/receive unit, which is connected to the control unit. The transmit/receive unit and the control unit are formed for preferably writing received data without buffering via the second memory interface. The transmit/receive unit and the control unit are further formed for preferably reading transmit data without buffering via the second memory interface. The reading and writing in this case occur directly via the second interface and not via the arithmetic logic unit or a buffer for buffering. In this case, the transmit/receive unit is formed to transmit and receive data streams of data by radio.

The object of the invention furthermore is to provide as improved a receiving process as possible and/or as improved a transmitting process as possible. Accordingly, a process for transmitting in a radio network is provided in an aspect of the invention. The radio network in this case can have multiple parties (nodes), between which data can be transmitted.

In the process, an arithmetic logic unit writes the data to be transmitted via a first memory interface in a memory region of the memory. The memory region is defined, for example, by a start address and subsequent addresses of the memory. The size of the memory region is preferably defined by a number of frames. To store the data to be transmitted, the data can be transferred from the arithmetic logic unit to the first memory interface advantageously over a bus.

Later, the arithmetic logic unit stores a transmit address, which points to the data to be transmitted and can also be called a pointer, in a control unit. Advantageously, the pointer points to the start address for the data to be transmitted. Preferably, the transmit address is stored as a register value in a register of the control unit. To this end, the register value of the transmit address is transferred via a connection, particularly a bus, from the arithmetic logic unit to the control unit.

The control unit reads out the data to be transmitted via a second memory interface by means of the transmit address. To this end, the control unit applies the transmit address at an address memory input and optionally, for example, subsequent addresses for other data to be transmitted. The data to be transmitted are passed on from the control unit to a transmit/receive unit for transmission preferably without buffering. Preferably, at the same time, additional data to be transmitted from the arithmetic logic unit by means of another pointer via the first interface are written in the memory.

Another aspect of the invention is a process for receiving in a radio network. In the process, an arithmetic logic unit stores a receive address, which can also be called a pointer, in a control unit. Preferably, the control unit has a register in which the receive address is stored as a register value.

The control unit stores data received via a transmit/receive unit by means of the receive address in a memory. To this end, the control unit applies the receive address at an address memory input and optionally, for example, subsequent addresses for other received data. The received data are written via a second memory interface in the memory, preferably without prior buffering, therefore free of buffering.

Later, the arithmetic logic unit reads out the received data via a first memory interface. Preferably, at the same time, other data are received and written in the memory via the second interface.

The invention furthermore has as its object to provide a use of a memory. Accordingly, a use of a memory is provided with a first interface for reading and writing and with a second interface for reading and writing in a radio network circuit.

The memory is used for access by an arithmetic logic unit to the memory via the first interface. Furthermore, the memory is used for simultaneous access by a control unit for writing received data or for reading data to be transmitted via a second memory interface.

The embodiments described hereinafter relate to the circuit, as well as to the use, to the process for transmitting, and to the process for receiving. Methods features or use features emerge, for example, from the functions of the circuit.

According to an embodiment, the control unit can be formed for writing the received data at a predefined receive address in the memory. The arithmetic logic unit is advantageously set up to predefine the receive address particularly by writing a register value in the control unit.

In another embodiment, the control unit can be formed for reading the transmit data from a predefined transmit address in the memory. The arithmetic logic unit is advantageously set up to predefine the transmit address particularly by writing a register value in the control unit.

According to an embodiment, the control circuit can have a programmable receive register for storing the receive address. According to another advantageous embodiment, the control circuit has a programmable transmit register for storing the transmit address. Advantageously, the arithmetic logic unit is set up for programming the receive register and/or the transmit register.

In an embodiment, the circuit can have an encryption unit for encrypting the transmit data and/or for decrypting the received data. Advantageously, an encryption algorithm and/or a decryption algorithm are hardware implemented in the encryption unit, so that encryption of the transmit data and/or decryption of the received data can occur parallel to a program run in the arithmetic logic unit.

The encryption unit can be connected to the control unit to enable reading and/or writing of data to be encrypted and/or encrypted data and/or data to be decrypted and/or decrypted data via the second memory interface.

According to an embodiment, the control unit can be formed to write the transmit data encrypted by the encryption unit at a predefined transmit address in the memory, particularly by means of the pointer. According to another advantageous refinement variant, the control unit is formed to write the received data decrypted by the encryption unit at a predefined receive address in the memory, particularly by means of the pointer.

According to an embodiment, the control unit can have a key register for storing a key address of a key storable in the memory for encryption and/or decryption.

An embodiment provides that the control unit can be connected to the arithmetic logic unit via a bus. Preferably, the arithmetic logic unit is set up for programming the receive register and/or the transmit register and/or the key register. For programming one of the registers, copy commands or the like can be provided during the program run in the arithmetic logic unit.

According to an embodiment, the control unit can be formed for prioritizing access by the transmit/receive unit and at least one other unit to the memory via the second memory interface. The other unit is, for example, an encryption unit or the control unit itself.

Further, the control unit can be formed to generate an address region from an address stored in a register. Advantageously, the address region is generated from the stored address and a predefined length of a frame of data to be received or to be transmitted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
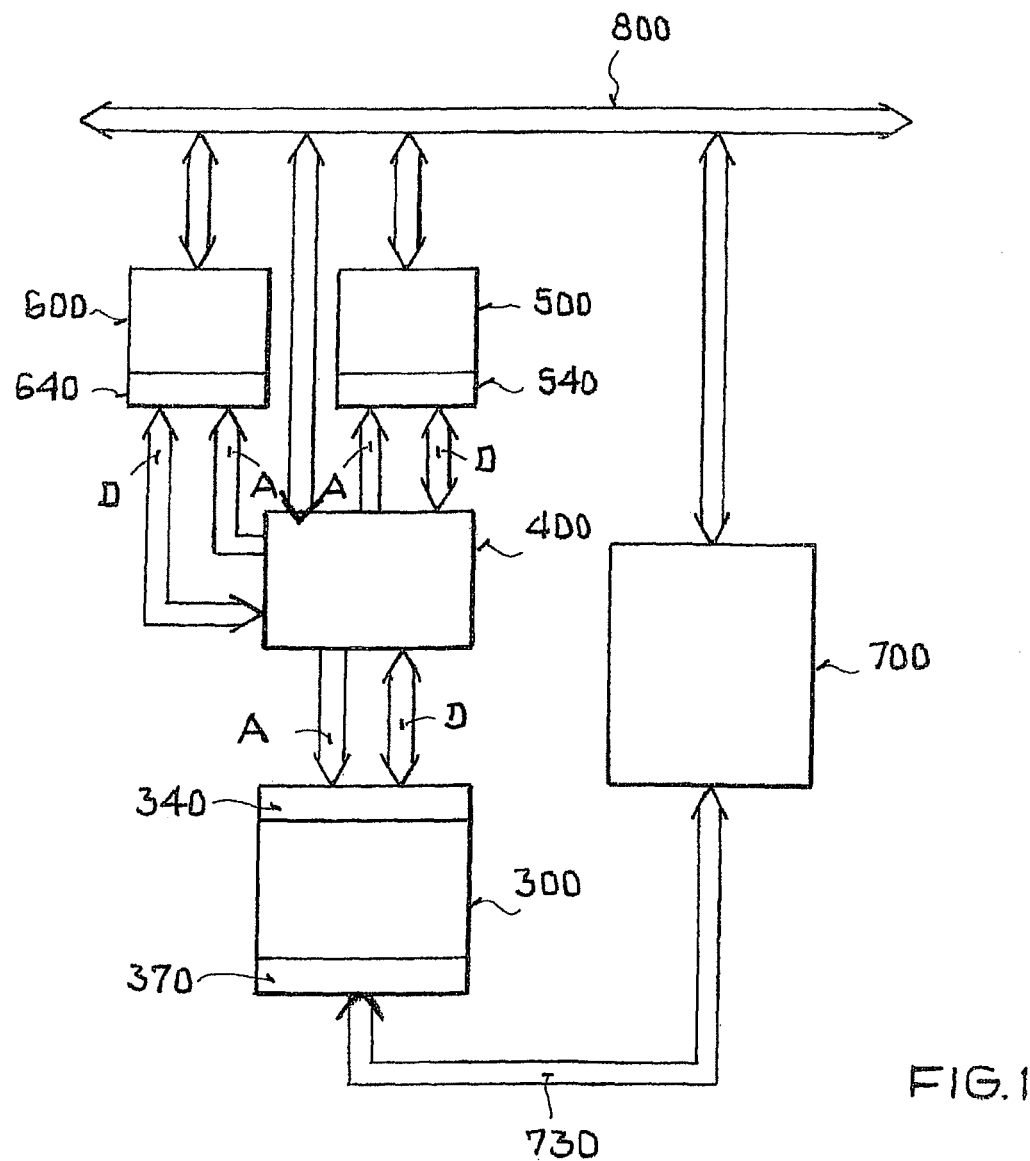
FIG. 1 is a schematic block diagram of a circuit.

A schematic block diagram of a circuit for transmitting and/or receiving in a radio network is shown in FIG. 1. A transmit/receive unit 500 is provided for transmitting and/or receiving over a wireless connection. Transmit/receive unit 500 can be called a transceiver if both receiving and transmission are possible. Transmit/receive unit 500 has an interface 540 over which it is connected to a control circuit 400 for transmission of data D and addresses A. Furthermore, transmit/receive unit 500 is connected via a data bus 800 to an arithmetic logic unit 700, for example, a computing core of a microcontroller. Arithmetic logic unit 700 can be formed as a processor. Control circuit 400 is also connected via bus connection 800 to arithmetic logic unit 700 for programming.

Arithmetic logic unit 700 is connected via a bus connection 730 to a first interface 370 of a memory 300. Said bus connection 730 differs from input/output bus 800. Memory 300 is a volatile memory, for example, RAM, particularly SRAM. Furthermore, memory 300 has a second interface 340, by means of which data D and addresses A can be transmitted between control circuit 400 and memory 300. First interface 370 and second interface 340 can also be called ports. Memory 300 with the two interfaces 370, 340 can be called a dual-port memory.

Control circuit 400 is connected to an encryption unit 600 via an interface 640 of encryption unit 600 for transmitting data D and addresses A. Encryption unit 600 is formed for encrypting data to be transmitted and for decrypting received data. Encryption unit 600 can also be called an AES security engine (AES: advanced encryption standard). Encryption unit 600 is connected via bus connection 800 to arithmetic logic unit 700 for configuration.

In an exemplary embodiment, SRAM 300 is designed as a dual-port RAM with first interface 370 and second interface 340. First port 370 is used by processor 700, and transceiver 500 and AES security engine 600 are connected at second port 340 via control circuit 400. Transceiver 500 and the AES security engine 600 may have the entire memory region of SRAM 300 at their disposal. Via control register in control circuit 400, software running in arithmetic logic unit 700 establishes the address at which an incoming receive frame of data is stored.

After said receive frame is received, a new pointer is written in the control register of control circuit 400, and transceiver 500 is again ready for new receiving. The start address for AES security engine 600 is established via another pointer. The AES security engine in this case utilizes a key—such as a network key, a group key, and/or a node-specific key—which can be stored in SRAM 300. An additional control register makes possible the configuration and start of AES security engine 600. In this case, a hardware-implemented algorithm, for example, a CCM* encryption protocol, may be used. A memory-control unit of control circuit 400 controls memory access between transceiver 500 and AES security engine 600. In this way, operations of transceiver 500 and AES security engine 600 can be carried out in parallel in different memory regions of SRAM 300. Irrespective of access via second port 340, processor 700 can access SRAM 300 via first port 370.

Received data frames or data frames to be transmitted are automatically stored in SRAM 300 by the previously explained exemplary embodiment. Operations such as frame security or the transmission of the frame can be carried out without additional copy operations. Only pointer operations are carried out by the software of processor 700, so that only very low computational resources of processor 700 are required. Software cost is reduced. In addition, transmit frames or receive frames can be stored as long as desired, irrespective of new data to be received or new data to be transmitted, in SRAM 300, until, for example, the computing power of processor 700 is again available for lower-priority data as well.

Figure 2:
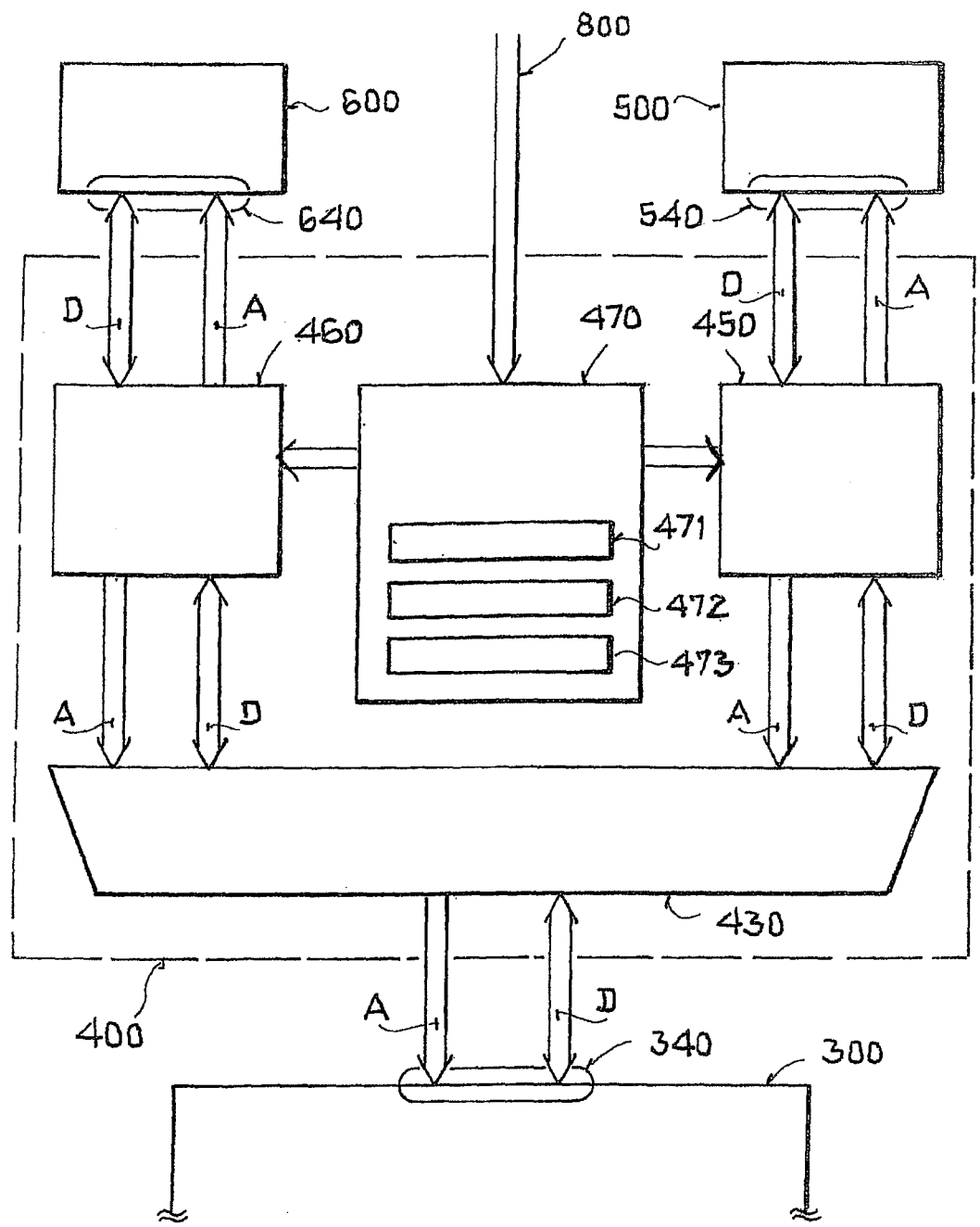
FIG. 2 is a schematic block diagram of a control circuit.

An exemplary embodiment of a control circuit 400 and its connections is shown as a schematic block diagram in FIG. 2. Control circuit 400 can access a volatile memory 300 via an interface 340. For access to memory 300, control circuit 400 has a memory control unit 430, which is formed in addition for access control for bus arbitration and a prioritizing function. Control circuit 400 has a configuration unit 470. Configuration unit 470 has a number of registers 471, 472, 473. In registers 471, 472, 473, different pointers for different addresses can be written in memory 300. Registers 471, 472 are equivalent. Each of the two registers can be utilized for the transmit address or receive address. Register 473 is preferably used exclusively as the start address for the key.

A first generator unit 450 for generating memory addresses from the transmit address stored in register 471 and/or receive address stored in register 472 is connected to configuration unit 470. Advantageously, proceeding from the stored address, subsequent addresses are generated by generator unit 450. A second generator unit 460 for generating memory addresses from the address stored in register 473 for the encrypted and/or decrypted data is connected to configuration unit 470.

Figure 3:
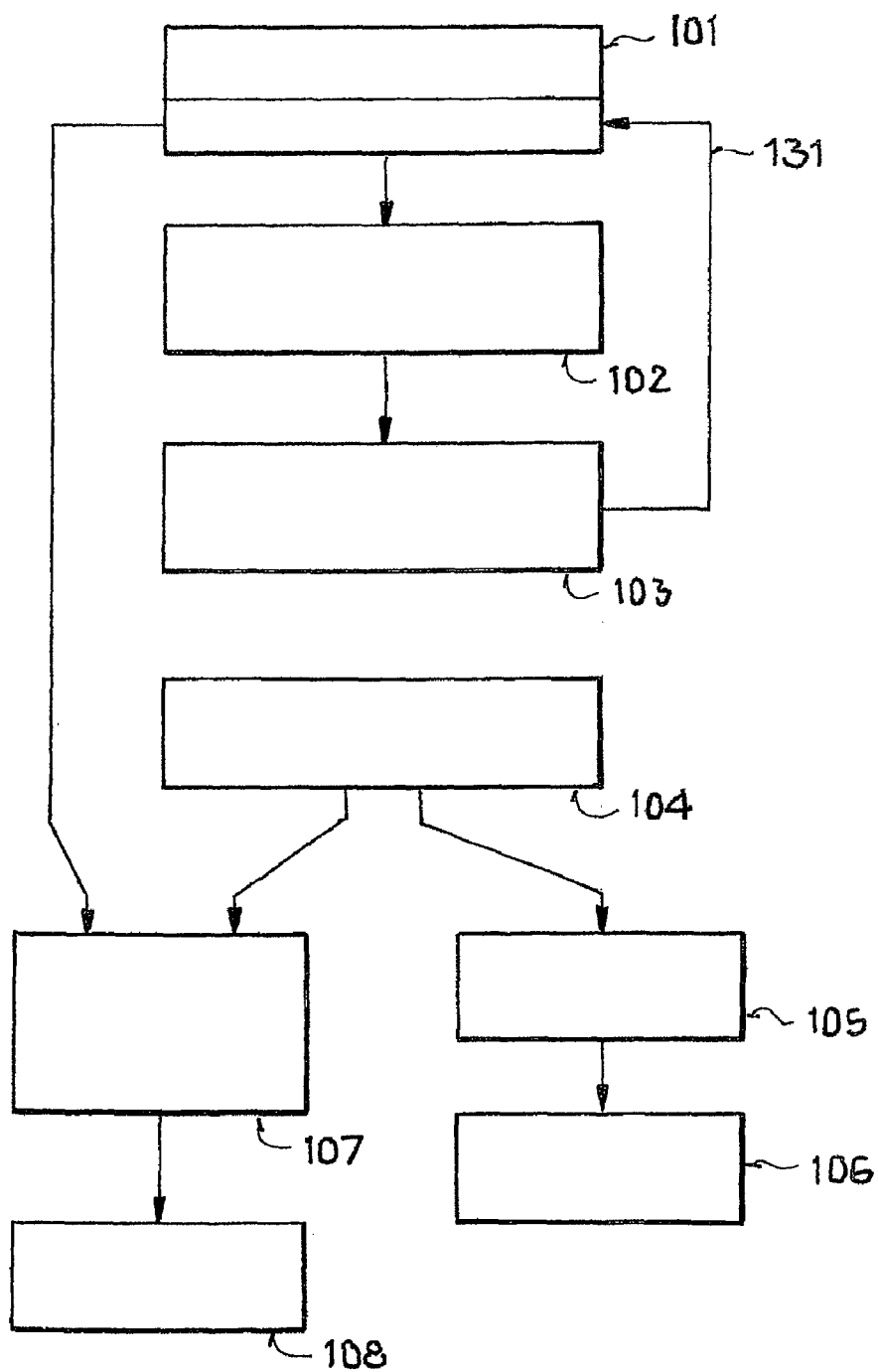
FIG. 3 is a schematic flowchart.

A process for receiving data in a radio network is shown in FIG. 3 in the form of a schematic flowchart.

In step 101, a pointer for a frame of data to be received is stored in a control unit. The pointer in this case points to an address in a memory. The pointer is previously defined in an arithmetic logic unit and transmitted to the control unit.

In step 102, the data of the frame are received via a transmit/receive unit of the control unit. The received data are stored by means of the pointer in the memory via a second interface of the memory without buffering.

Next, in step 103 the data of the frame are evaluated by the arithmetic logic unit, in that the arithmetic logic unit accesses the memory via a first interface. The security level and if applicable the key type are determined with the evaluation. If the data of the frame are transmitted without encryption, the arithmetic logic unit reads out the received data via the first memory interface. In the case of encrypted transmission, the process proceeds via functional connection 131 to step 1, whereby the determined security level is stored in the pointer.

Later in time, in step 104 a further configuration of a pointer occurs for the decryption. In step 105, a pointer for the following transmitted and received data is configured. At the same time, to this end, in step 107 after the completion of steps 101 and 104, the decryption operation is carried out as a function of the pointer for the decryption. The decryption is completed in step 108. Previously or at the same time, in step 106 the receiver is ready to receive the data of the next frame. The decryption and receiving can be carried out in the exemplary embodiment of FIG. 3 at least in part parallel in time.

Simultaneous to process steps 101 to 108, the arithmetic logic unit can access the memory collision-free via the first interface, for example, to read control data for actuator control or to store measured data from a sensor.

Figure 4:
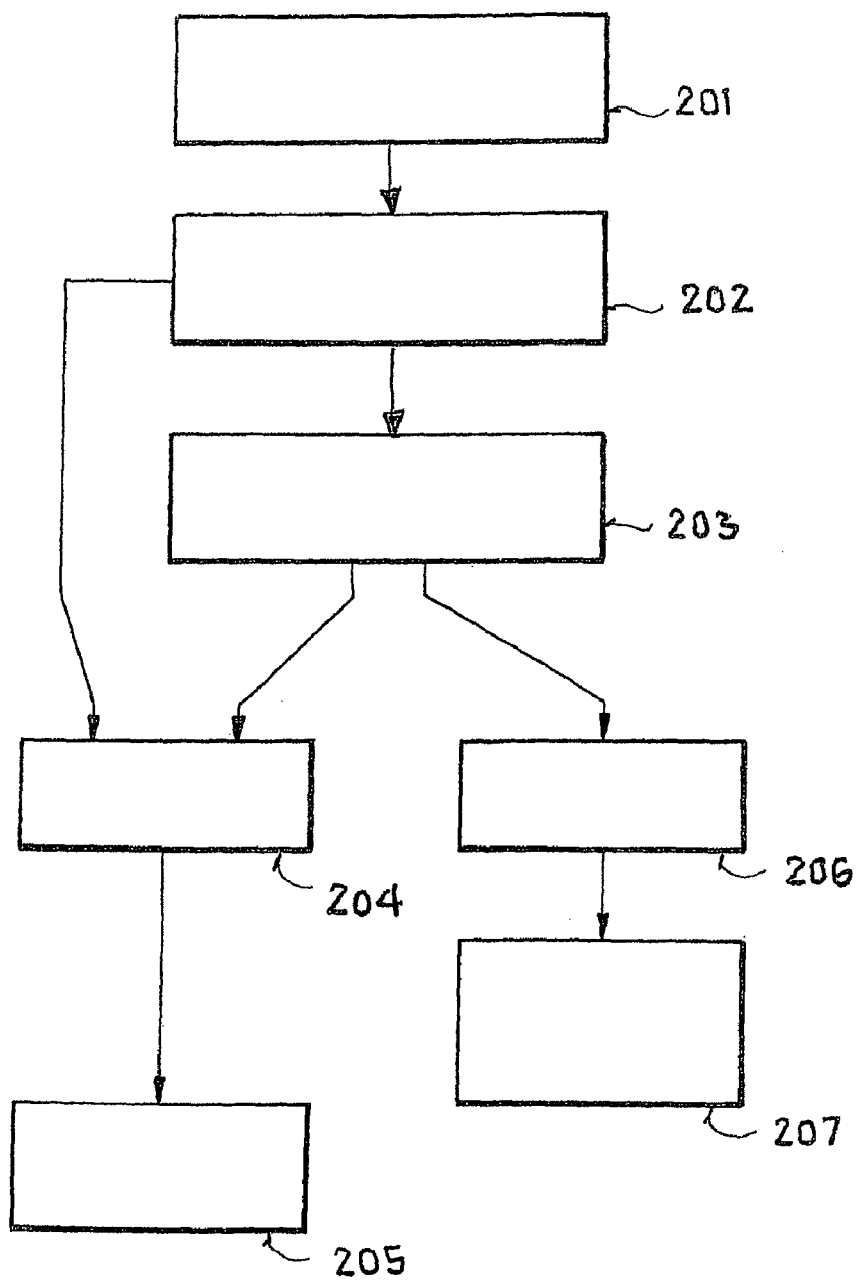
FIG. 4 is a schematic flowchart.
Figure 5:
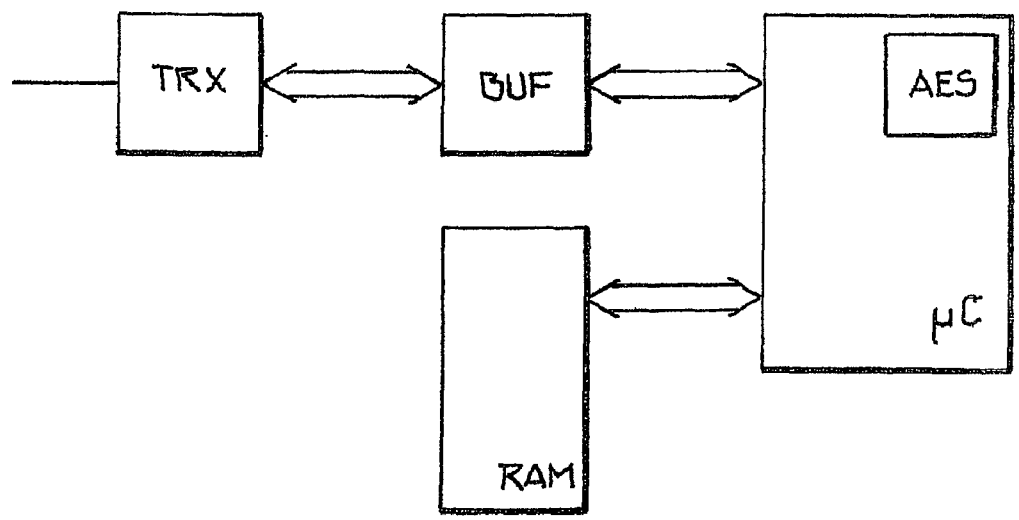
FIG. 5 is a transmit/receive device.

A process for transmitting data in a radio network is shown in FIG. 4 in the form of a schematic flowchart.

In step 201, an arithmetic logic unit stores data to be transmitted in a frame in a memory. For this purpose, the arithmetic logic unit via a first memory interface writes the data to be transmitted in a memory region.

In step 202, the arithmetic logic unit configures a control unit in that the arithmetic logic unit stores a pointer pointing to the data to be transmitted in the control unit. In addition, security information can also be stored, for example, via the security level.

In step 203, another pointer to the data to be transmitted for the encryption is stored. It establishes, for example, the key stored at the corresponding memory address for the encryption of the data to be transmitted.

After the two steps 202 and 203, the encryption operation can occur in step 204. If the encryption is completed, in step 205 the transmission of the encrypted data of the frame can be started. If encryption of the data to be transmitted is not necessary, step 204 can be skipped. For transmission, the control unit by means of the pointer reads out the data to be transmitted via a second memory interface. For transmission, the data to be transmitted are passed on to a transmit/receive unit without buffering.

At the same time as step 204, another pointer can be configured in step 206. Even in step 207, therefore simultaneously to or before the transmission of data in step 205, the next data to be transmitted of the next frame can be prepared. Alternatively, it is also possible in step 207 to start a procedure to receive data according to steps 101 ff. in FIG. 3 and thus to activate a ready-to-receive state.

The invention is not limited to the shown embodiment variants in FIGS. 1 through 4. For example, it is possible to incorporate other process steps into the sequences according to FIG. 3 or 4. It is also possible to provide a greater number of registers for multiple frames for receiving or for transmitting. The functionality of the circuit according to FIG. 1 can be used especially advantageously for a radio network according to the ZigBee industry standard. A radio network is alternatively formed according to the industry standard IEEE 802.11.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit for transmitting and/or receiving in a radio network, the circuit comprising:
   a memory having a first interface for reading and writing and a second interface for reading and writing;
   an arithmetic logic unit connected to the first interface for reading and writing;
   a control unit connected to the second interface for reading and writing and to the arithmetic logic unit; and
   a transmit/receive unit connected to the control unit;
   wherein the arithmetic logic unit is configured to store a first receive address and a first transmit address in the control unit, wherein the control unit is configured to receive data from the transmit/receive unit and write the received data to the memory at the first receive address via the second memory interface, and wherein the control unit is configured to read transmit data from the memory at the first transmit address via the second interface of the memory and send the transmit data to the transmit/receive unit via the second interface of the memory.

2. The circuit according to claim 1, wherein the control unit comprises at least one of a programmable receive register configured to store the receive address and a programmable transmit register configured to store the transmit address.

3. The circuit according to claim 2, wherein the control unit further comprises a key register configured to store a key address of a key storable in the memory for at least one of encryption and decryption, wherein the control unit is connected to the arithmetic logic unit via a bus, and wherein the arithmetic logic unit is configured for programming the receive register, the transmit register, and the key register.

4. The circuit according to claim 1, further comprising an encryption unit configured to encrypt the transmit data and decrypt the received data, wherein the encryption unit is connected to the control unit.

5. The circuit according to claim 4, wherein the control unit is configured to receive the transmit data encrypted by the encryption unit and write the encrypted transmit data to the memory at the first transmit address or a second transmit address, and wherein the control unit is configured to write the decrypted received data at the first receive address or a second receive address.

6. The circuit according to claim 1, wherein the control unit comprises a key register configured to store a key address of a key storable in the memory for at least one of encryption and decryption.

7. The circuit according to claim 1, wherein the control unit, is configured to prioritize access to the second interface of the memory by the transmit/receive unit and at least one other unit.

8. The circuit according to claim 1, wherein the control unit is configured to generate an address region from an address stored in a register.

9. A method for transmitting in a radio network, the method comprising:

writing, by an arithmetic logic unit, transmit data to a memory region of a memory via a first interface of the memory;

storing, by the arithmetic logic unit a transmit address in a transmit register of a control unit, the transmit address pointing to the transmit data;

reading, by the control unit, the transmit data from the memory at the transmit address via a second interface of the memory and forwarding the transmit data to a transmit/receive unit for transmission.

10. A method for receiving in a radio network, the method comprising:

receiving data by a transmit/receive unit;

storing, by an arithmetic logic unit, a receive address in a receive register of a control unit;

storing, by the control unit, the received data at the receive address in a memory via a second interface of the memory; and reading, by the arithmetic logic unit, the received data via a first interface of the memory.

11. A circuit for transmitting and/or receiving in a radio network, the circuit comprising:

a memory having a first interface for reading and writing and a second interface for reading and writing;

an arithmetic logic unit connected to the first interface for reading and writing;

a control unit connected to the arithmetic logic unit via a bus and connected to the second interface for reading and writing, the control unit comprising:

a receive register configured to store a receive address, a transmit register configured to store a transmit address, and a key register configured to store a key address of a key stored in the memory for at least one of encryption and decryption; and a transmit/receive unit connected to the control unit;

wherein the control unit is configured to:

receive data from the transmit/receive unit and write the received data to the memory at the receive address via the second memory interface and read transmit data from the memory at the transmit address via the second interface of the memory and send the transmit data to the transmit/receive unit via the second interface of the memory; and wherein the arithmetic logic unit is configured to:

store the receive address in the receive register and read the received data from the memory at the receive address via the first interface of the memory, write the transmit data to the memory at the transmit address via the first interface of the memory and store the transmit address in the transmit register, and store the key address in the key register.

* * * * *